Dec. 20, 1932.  M. SPITZ ET AL  1,891,845
FOLDING KAISER ROLL
Filed July 11, 1932  4 Sheets-Sheet 1

M. Spitz
J. Srovnal
INVENTORS

By: Marks & Clerk
ATTYS

Dec. 20, 1932. M. SPITZ ET AL 1,891,845
FOLDING KAISER ROLL
Filed July 11, 1932  4 Sheets-Sheet 2
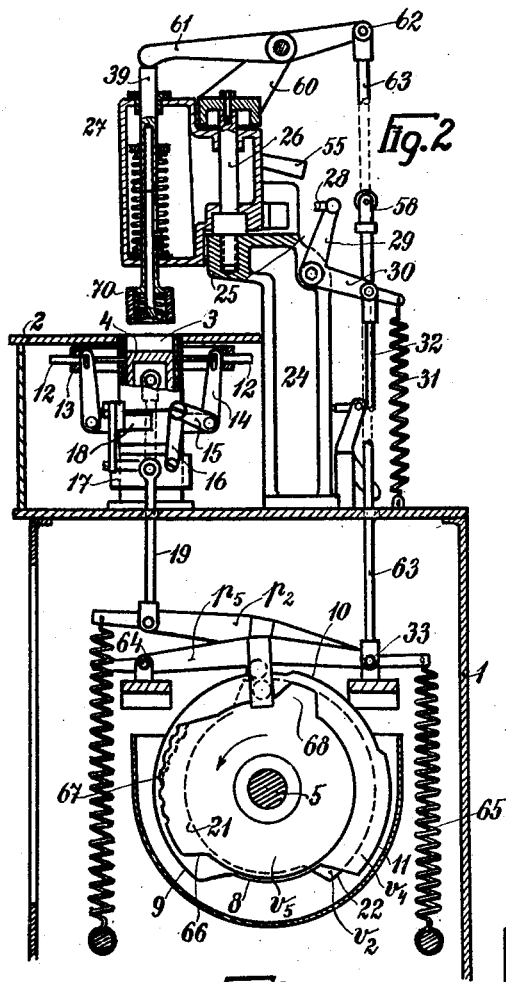
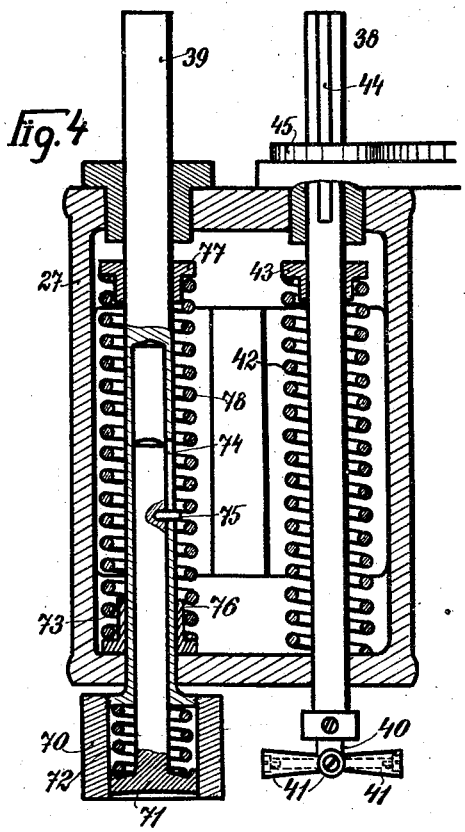
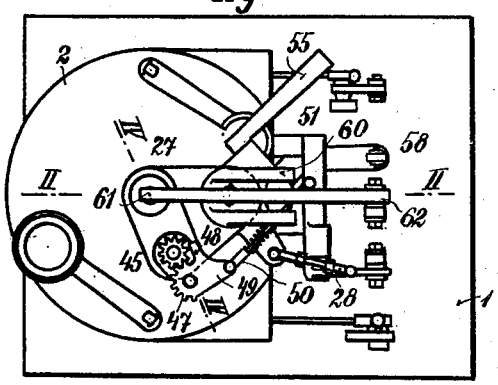
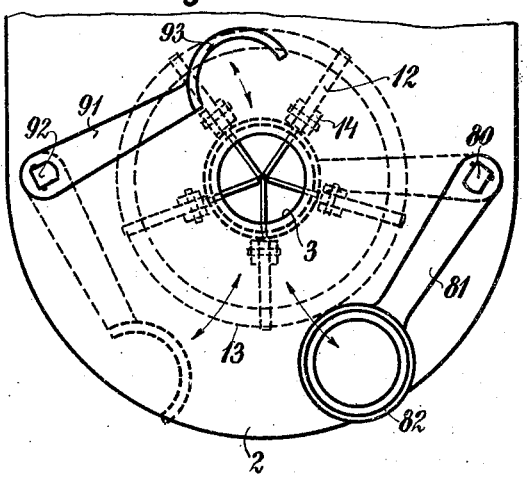

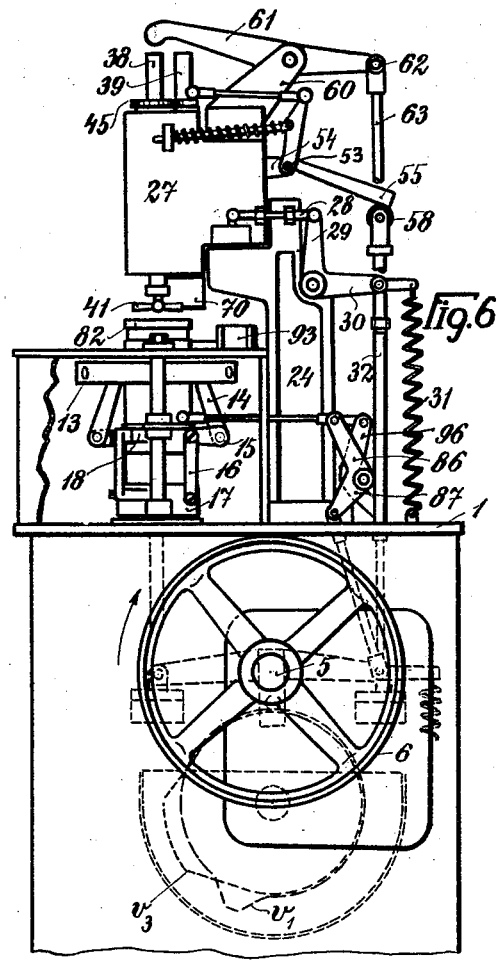
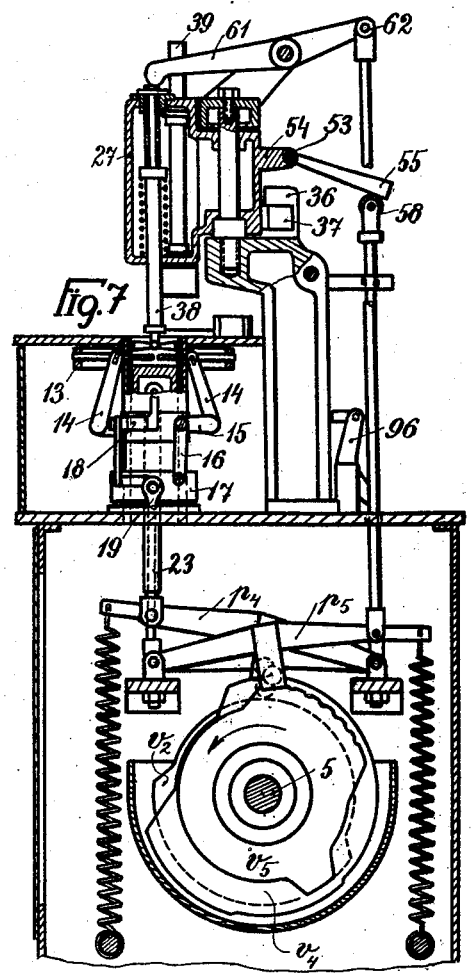
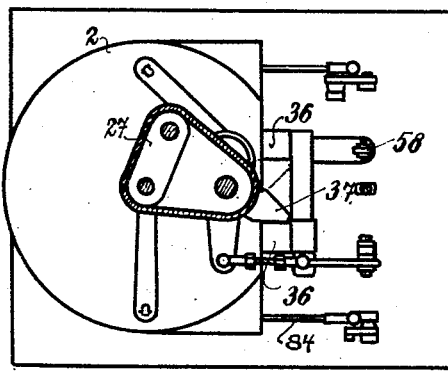
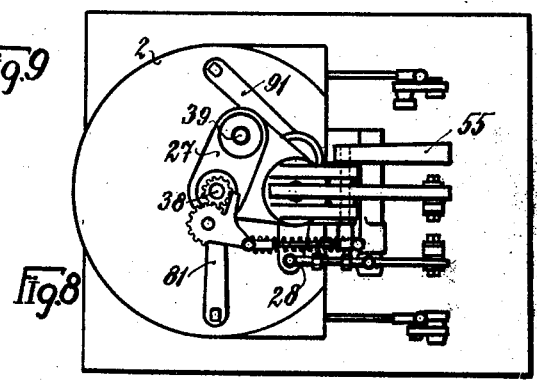

Dec. 20, 1932.  M. SPITZ ET AL  1,891,845
FOLDING KAISER ROLL
Filed July 11, 1932  4 Sheets-Sheet 4
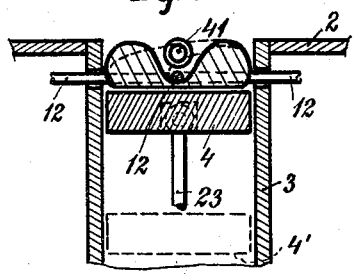
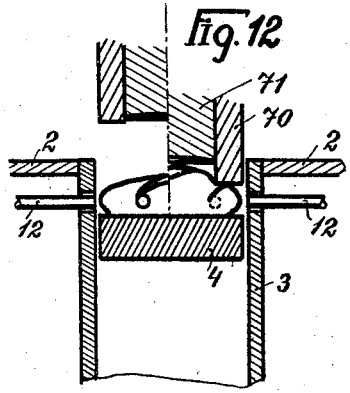

Patented Dec. 20, 1932

1,891,845

UNITED STATES PATENT OFFICE

MAX SPITZ AND JOSEF SROVNAL, OF LIBEREC, CZECHOSLOVAKIA; SAID SROVNAL ASSIGNOR TO SAID SPITZ

FOLDING KAISER ROLL

Application filed July 11, 1932, Serial No. 621,958, and in Czechoslovakia July 14, 1931.

"Kaiser" rolls could not hitherto be made mechanically. The mechanical production has, up to the present, only imitated "kaiser" rolls, namely by making a star shaped incision in a rounded piece of dough by the aid of a worm, for which purpose moreover a special guidance of the dough was required. This involves a serious disadvantage in bakery operation, and furthermore does not produce correctly folded "kaiser" rolls.

According to the present invention these disadvantages are completely removed by a method of production which permits of rapid mechanical formation of correctly folded "kaiser" rolls. The process consists in dividing a spherical piece of dough, by the aid of pins or the like pressed horizontally into it, into a number of panels corresponding to the number of folds, separated from one another by deep furrows, but still connected with one another by the bottom layer of dough, and rolling the mass of dough standing above the pins or the like in one direction over the adjacent panel. In this way are obtained overlapping folds similar to those in "kaiser" rolls folded by hand.

The machine for carrying out this process is illustrated by way of example in the accompanying drawings, in which Figure 1 shows the general arrangement of the machine, with the framework omitted;

Figure 2 shows a sectional elevation on the line II—II in Figure 3;

Figure 3 shows the machine in plan;

Figure 4 shows a section on the line IV—IV in Figure 3 on a larger scale;

Figure 5 shows in plan on a larger scale the table top of the machine, with feeding and removing members in their end positions;

Figure 6 shows the machine in side elevation;

Figure 7 is a view similar to Figure 2 but with the rolling out member in its working position;

Figure 8 is a plan thereof;

Figure 9 is a plan view showing a detail, and

Figures 10, 11 and 12 are diagrammatic views serving to illustrate the process.

Figure 1:
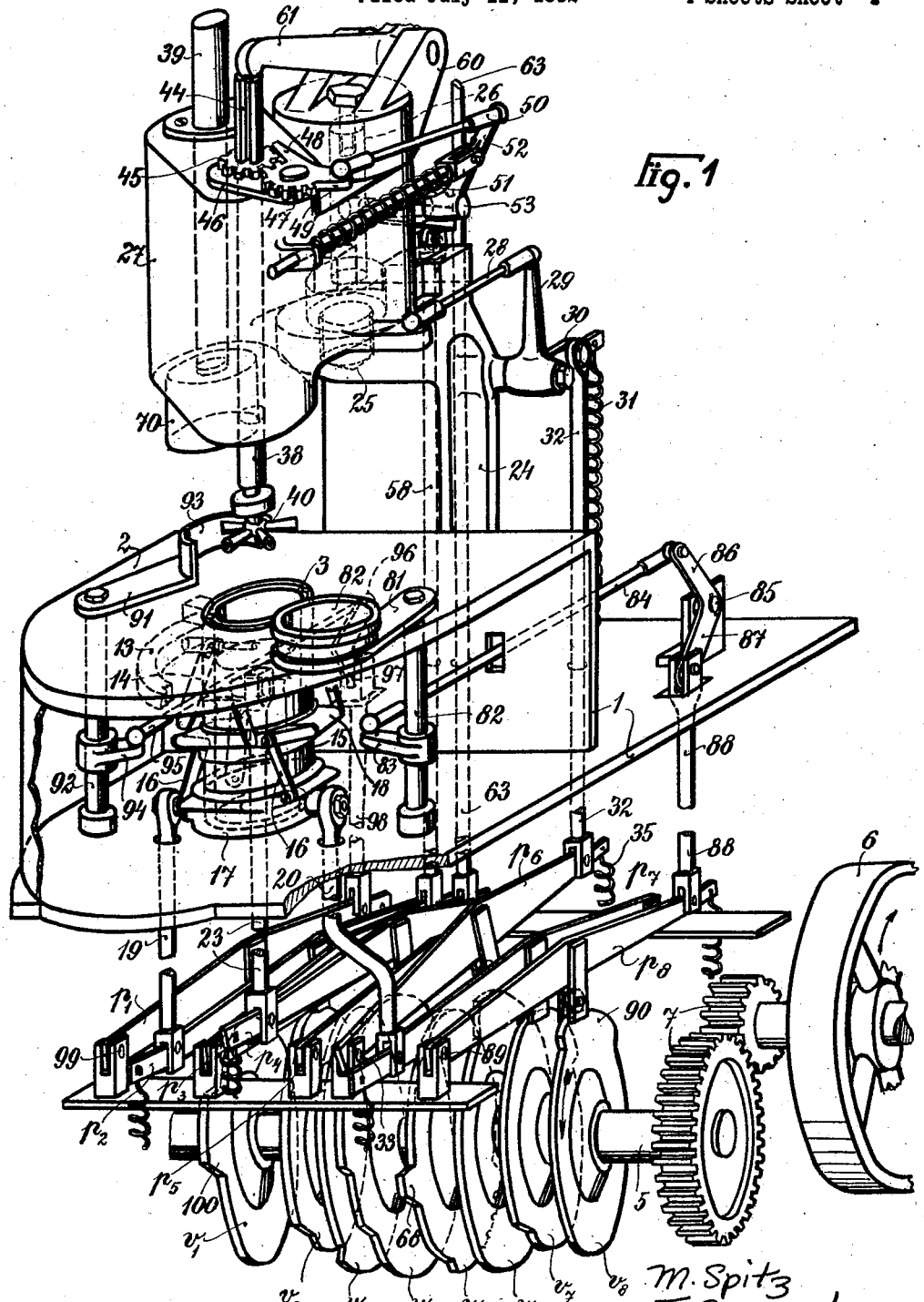

On a standard 1 of the machine, which is only illustrated in its upper portion in Figure 1, is provided a horizontal table top 2, in the middle of which is located a circular aperture. In this aperture is inserted a vertical cylinder 3, in which a piston head 4 is displaceable. For the driving of the machine there is journalled in the standard 1 a horizontal shaft 5, to which are keyed a number of cam discs which bring about the various operations of the machine. The driving of the shaft 5 is effected from a belt pulley 6, preferably through toothed wheel gearing 7. The working positions of the piston head 4 are determined by a cam disc $v_4$ (Figure 2), which has a portion 8 of small radius and a portion of larger radius. The latter consists of three steps 9, 10 and 11, of which the step 9 serves for raising the piston 4 into the working position for the purpose of impressing the panels in the piece of dough, the step 10 for the partial raising of the folded piece of dough in the cylinder 3, and the highest step 11 for raising the piston 4 into a position in which the upper surface of the piston head 4 is located in the same plane as the table 2. The cam disc $v_4$ acts upon the piston 4 by means of a lever $p_4$ and a push rod 23.

In the neighbourhood of the upper end of the cylinder there is a number of radial pins 12, five for example, which are guided at one end in the cylinder wall and at the other end in a ring 13 surrounding the cylinder at a distance. To these pins there are attached, by means of pin and slot connections, arms 14 of bell crank levers 14, 15, of which the other arms 15 are each pivotally connected by a link 16 with a ring 17 vertically slidable along the cylinder 4. The bell crank levers 14 and 15 are supported in bearings 18 on the cylinder 3. For the vertical shifting of the ring 17 there serve two pull rods 19 and 20, shown in Figures 1, 2 and 7 which are shifted by means of a one-armed lever $p_2$ and $p_7$ respectively, rockable about a pivot on the frame, by means of cam discs $v_2$ and $v_7$ respectively, keyed on to the shaft 5. The cam discs $v_2$ and $v_7$ each comprise a portion 21 of small diameter and a portion 22 of large diameter, these diameters corresponding on the one hand to the position of the pins 12 (Figure 5) when pushed into the cylinder 3, and on the other hand to the position of these pins (Figure 2) when drawn out of the cylinder 3.

The upper part of the machine frame 1 carries a standard 24, with an upper bracket-like projection 25, upon which, by means of a vertical bolt 26, a headpiece 27 is so supported as to be oscillatable about this bolt. The head 27 is connected by a pull rod 28 with a bell crank lever 29, 30, which is supported on the standard 24, and which is loaded, on its arm 30, by a tension spring 31, and is connected, by a pull rod 32, with a one-armed lever $p_6$, which is rockably supported about a bolt 33, and which co-operates with a cam disc $v_6$ secured upon the shaft 5, as shown in Figure 1. The cam disc $v_6$ is similar in construction to the cam discs $v_2$ and $v_7$, and by the same the head 27 can be brought into two end positions, the tension spring 31 on the one hand and a tension spring 35 that loads the lever $p_6$ on the other hand serving for returning the head 27, or maintaining the contact between the slide roller of the lever $p_6$ and the cam disc $v_6$. The two end positions of the head are determined by stops 36 on the standard 24, which co-operate with a central stop 37 on the head 27, as shown in Figure 9. In the head 27 two vertically guided rods 38, 39 are fitted in such a way that in one end position of the head 27 one rod is co-axial with the cylinder 3 of the table 2, and in the other end position of the head the other rod is co-axial with the cylinder.

The rods 38, 39 of the head 27 carry at their lower ends implements for manipulating the dough. The implement carried by the rod 38, as shown in Figures 1 and 4, consists of a star 40, the arms of which are formed by conical rollers 41 tapering towards the rod 38. The number of roller arms of the star 40 corresponds to the number of pins 12, in the present instance, five.

In the interior of the head 28 there is slipped on to the rod 38 a compression spring 42, shown in Figure 4, which bears at one end against the bottom of the head 27 and at the other end against a positioning ring 43 secured upon the rod 38. The spring 42 tends to keep the rod 38, together with the star 40, in the raised position. The upper end of the rod 38, which projects out of the head 27, is connected by a tongue and groove 44 with a toothed wheel 45, by which the rod 38 can be rotated, while remaining free to move axially through the wheel 45. On the bearing bush 46 of the toothed wheel 45 of the rod 38 is rotatably mounted a toothed segment 47, with a stop cam 48, this segment terminating in an arm 49, which is pivotally connected by a pull rod 50, shown in Figure 1, with an arm 52, loaded by a compression spring 51. The arm 52 is secured upon a shaft 53, which is supported in a bearing member 54 on the head 27 and is provided at the other end with an arm 55, shown in Figures 3, 6, 7 and 8. The position of the arm 55 on the head 27 is such that when the star 40 is located above the cylinder 3 the arm 55 engages, as shown in Figure 7, over the upper end of a pressure rod 58, guided vertically in the frame 1, and pivotally connected by its lower end with a one-armed lever $p_3$, rockable about a pivot on the frame and loaded by a tension spring. The one-armed lever $p_3$ co-operates with a cam disc $v_3$ mounted fast upon the shaft 5. The form of the cam disc $v_3$ (Figure 1) that raises the pressure rod 58 exhibits a gradually increasing radius, so that as the shaft 5 rotates a gradual pushing upwards of the pressure rod 58 takes place, and therefore a progressive rocking of the arms 55 and 52 and a rotation of the segment 47, which results in a rotation of the roller star 40. In a bracket 60 mounted upon the bolt 26 on the standard 24 is supported a two-armed lever 61, 62, which, with its arm 61, reaches beyond the rod 38 or 39 that is at the time in the working position, while the other arm 62 of this lever is pivotally connected by means of a thrust rod 63 with a one-armed lever $p_5$ rotatable about a supporting pivot 64 on the machine frame. This lever $p_5$, loaded by a tension spring 65, co-operates by the aid of an antifriction roller with a cam disc $v_5$, shown in Figures 1, 2 and 7. The shape of this cam disc is such that during the rotation of the shaft 5, owing to the rocking of the lever 61, 62 brought about by the cam disc $v_5$, the rod 38 in the machine head 27, together with the roller star 40, is lowered by the cam portion 66 (Figure 7) into the upper end of the cylinder 3. The cam disc $v_5$, on its succeeding high portion, is kept with the same diameter as far as by the gradually ascending cam disc $v_3$ (Figure 1), the segmental transmission 45, 47, and therefore the rod 38, together with the roller star 40, is rotated. During this rotation of the star the antifriction roller for the lever 61, 62 moves over the high portion of the cam 66. This portion of the cam, after a short smooth commencement, is provided (Figure 7) with shallow waves or corrugations 67, so that during this movement the rod, together with the roller star 40, is repeatedly raised and lowered slightly, which assists the rolling out of the dough. The rod 38 is then set free again by the lever and raised by its spring 42. Immediately after this a shifting of the head 27 is effected, and its adjustment with the other rod 39 into a position above the cylinder 3, in which case the arm 55 passes out of reach of the thrust rod 58, and the other rod 39 takes up a position underneath the lever arm 61. Another cam 68 on the same cam disc $v_5$ then immediately comes into action, and, with the aid of the levers $p_5$ and 61, 62, presses down the rod 39, together with the implement secured to its lower end, into the cylinder 3. The implement at the lower end of the rod 39 (Figure 4) consists of a hollow cylindrical member 70, closed at the top and open at the bottom. In the cavity inside the cylinder 70 there moves a piston-like bottom 71, which is loaded by a compression spring 72 concealed in the cavity in the interior of the cylinder. The piston head or bottom 71 has a stem 73, which is guided in the correspondingly hollow rod 39. This stem carries an abutment pin 75, which projects through a longitudinal slot 74 in the rod 39 and projects beyond the surface of the rod 39, in such a way that during the depression of the rod 39 the pin 75 strikes against the upper margin of a lower guide 76 on this rod 39, and holds back the stem 73, together with the bottom 71, while the rod 39, together with the cylinder member 70, continues to descend, so that in the cylinder 70 a cavity open at the bottom is produced. During the raising of the rod 39, by means of a compression spring 78 interposed between the bearing 76 and an upper collar 77 thereon, the piston head or bottom 71 is lowered again by its compression spring 72 until the pin 75 comes into contact with the lower end of the slot 74, to which position of the pin 75 in the slot 74 there corresponds a position of the bottom 71 entirely closing the cylinder 70 at its lower end.

Beside the cylinder 3 an arm 81 is so supported upon the table top 2 as to be oscillatable about a vertical shaft 80, and this arm carries at its free end a bottomless box 82, in such a way that during the oscillation of the arm 81 upon the table the box 82 can be brought into a position above the cylinder 3 and co-axial therewith, as shown in dotted lines in Figure 5. The oscillating movements of the arm 81 are effected by means of an arm 83 secured upon its vertical shaft 80, through a pull rod 84, a bell crank lever 86, 87 rockable about a bolt 85, and a thrust rod 88, which is pivotally connected with the free end of a one-armed lever $p_3$, shown in Figure 1, which is rockable about a pivot 89 on the machine frame. The lever $p_3$ co-operates, by the aid of an antifriction roller, with a cam disc $v_8$ secured upon the shaft 5. The cam disc $v_8$ has a single cam 90, which corresponds to the deflected position of the box 82 above the cylinder 3.

On the other side of the cylinder 3 is a second arm 91 oscillatably supported on the table top 1 about a vertical shaft 92, and this arm is crescent shaped at its free end 93, and during its oscillation it can slide across the upper open end of the cylinder 3. A rapid oscillation of the arm 91 is effected by means of an arm 94, secured upon its vertical shaft 62, through a pull rod 95, a bell crank lever 96, 97 rockable on the machine frame, and a thrust rod 98. This thrust rod 98 is connected with a one-armed lever $p_1$, oscillatably supported about a pivot 99 on the machine frame, and co-operating with a cam disc $v_1$, having a steep cam 100.

The process according to the invention will be made clear by describing the method of operation of the machine. At the commencement of the work the piston head 4, forming the bottom of the cylinder 3, is located in its lowest position 4', shown in dotted lines in Figure 10. A piece of dough worked into the form of a ball is placed in the box 82, shown in Figures 1 and 5, and during the rotation of the cam shaft 5, actuated from the driving pulley 6, the arm 81, together with the box 82, is oscillated by means of the cam 90 on the cam disc $v_8$ into a position, shown in dotted lines in Figure 5, above the cylinder 3, whereupon the piece of dough located in the box drops into the cylinder 3, on to the lowered bottom thereof. In this position of the bottom 4 in the cylinder 3 the piece of dough is located so low down in the cylinder that during the further rotation of the cam shaft 5, during the raising of the ring 17 by means of the cam discs $v_2$ and $v_7$, the pins 12 actuated thereby can be pushed freely into the cylinder 3 above the piece of dough. The pins 12 are so distributed that they touch one another in the centre when fully pushed in, as shown in Figure 5. The raising of the piston head 4, together with the piece of dough, is then effected by the part 9 of the cam disc $v_4$, as a result of which the upper part of the piece of dough is forced between the pins 12, in such a way that deep furrows extending nearly to the bottom 4 are pressed in the piece of dough, and between these furrows the dough projects high above the pins 12. These individual panels of dough are still connected with one another, as shown in Figure 10, by the thin layer of dough remaining between the piston head 4 and the pins 12. By the part 66 of the cam disc $v_5$ which acts immediately thereafter upon the lever 61, 62, the rod 38, together with the roller star 40, is lowered into the cylinder, to such a depth that the conical rollers 41 of the star 40 take up positions between the panels of dough close above the pins 12, as shown in Figure 10. By means of the cam disc $v_3$, through the medium of the lever $p_3$, the thrust rod 58 and the arms 55 and 52, by the aid of the toothed wheels 46, 47, there is imparted to the rod 38, together with the star 40, a rotary movement during which, by the aid of the wave shaped construction of the cam portion 67 on the cam disc $v_5$, the star 40 is moved up and down slightly in a vertical direction a few times. By the co-operation of the rolling and pressing movement the portions of the dough projecting above the pins 12 are rolled out into flat lobes, which are each spread out over the adjacent panel of the piece of dough. The amplitude of the rotation of the roller star 40 corresponds to the distance through which it is desired to roll out the lobes of dough over the adjacent panels. The lever is then set free by the cam 66, 67 of the cam disc $v_5$, and the roller star 40 is lifted out of the cylinder 3 by the spring 42. The cam disc $v_5$ may if desired be so constructed that the rolling out member 40 always rises higher towards the end of its movement. This form of the cam disc $v_5$ is indicated in dotted lines in Figure 2. After the raising of the roller star 40 the head 27 is rocked back by the aid of the pull rod 28 and the bell crank lever 29, 30 after the cam $v_6$ has been set free by the springs 31 and 35, so that the pressing implement 70 now takes up a position above the cylinder 3, as shown in Figures 2 and 3. By the part 10 of the cam disc $v_4$ the bottom 4 of the cylinder, together with the folded piece of dough, is slightly raised. Shortly before this, by the lowering of the ring 17 by means of the pull rods 19 and 20 and the cam discs $v_2$ and $v_7$, the pins 12 have been withdrawn from the piece of dough. By the lever 61, 62 a short depression of the pressing implement 70, 71 into the cylinder 3 is now effected by means of the cam 68 on the cam disc $v_5$, during which the bottom 71 of the implement 70 remains behind and sets free the annular lower margin of the cylinder 70, which brings about a pressing of the margin of the roll and of the loose lobes thereof against the lower portion of the piece of dough, the holes left behind by the pins 12 being thus closed. The cam 68 of the cam disc $v_5$ then sets free the lever 61, 62 and therefore also the rod 39, which is raised again by the action of its spring 78. In order that the dough may not then remain sticking in the hollow cylinder 70 and be raised along with it, the lower cavity of this cylinder is filled up again immediatey afterwards by the bottom 71, so that any dough penetrating into the cylinder 70 is reliably expelled from the cylinder 70 by the bottom 71. After the raising of the pressing implement 70, 71 after the release thereof by the lever 61, 62, and the raising by its spring 72, the last stroke of the bottom 4 in the cylinder 3 is effected, together with the folded piece of dough lying thereon, by the action of the last part 11 of the cam disc $v_4$, this being effected in such a way that the upper surface of the bottom 4 comes into the same plane as the table 2, and in this manner the folded piece of dough comes to lie in the plane of the table. By a subsequent oscillating movement of the arm 91 with its crescent shaped end 93 the finished piece of folded dough is brought right to the margin of the table top 2, as shown in dotted lines in Figure 5. Meanwhile the head 27, by the action of the cam disc $v_6$ has been rocked back again, and the rod 38, with the roller star 40, have been brought into alignment with the axis of the cylinder 3. The cylinder bottom 4 is lowered by its cam disc $v_4$ into its lowest position, and a prepared piece of dough in the box 82 on the arm 81 is brought into the cylinder 3 again by oscillating the arm 81, and the series of operations of the machine commences afresh.

In this manner a high capacity mechanical production of so-called "kaiser" rolls is rendered possible.

In order to enable the machine to be adapted to the requisite size of the pieces of dough to be worked up the stroke of the working members 40 and 70 can be regulated by adjusting their drive. For this purpose lost motion may be provided between the end of the lever 61 and the rod 38 or 39 of the working members, and the extent of this lost motion may be increased or diminished by altering the length of the thrust rod 63, as a result of which the working stroke of the organs 40 and 70 is changed. This result can also be obtained by making the joint that connects the pull rod 63 with the lever 61, 62 adjustable by means of a longitudinal slot in the lever arm 62, thereby enabling the length of the lever arm 62 to be varied.

What we claim is:—

1. A method of folding "kaiser" rolls, comprising pressing deep radial furrows in a ball of dough so as to divide it into a number of up-standing sector-shaped panels only united by a relatively thin bottom layer of dough, and rolling out all the panels in the same circumferential direction so that each panel overlaps an adjacent panel.

2. A method of folding "kaiser" rolls, comprising pressing a plurality of deep radial furrows simultaneously in a ball of dough so as to divide it into a number of up-standing sector-shaped panels only united by a relatively thin bottom layer of dough, and rolling out all the panels simultaneously in the same circumferential direction so that each panel overlaps an adjacent panel.

3. A machine for folding "kaiser" rolls, comprising a cylinder open at one end, a piston head longitudinally displaceable in the cylinder, a plurality of pins adapted to be inserted radially into the cylinder and withdrawn when required, a rotatable radially arranged rolling out member co-axial with the cylinder and movable in the direction of the axis of the cylinder, means for retracting the piston head to enable a piece of dough to be introduced into the cylinder, means for pushing the pins radially into the cylinder, means for advancing the piston head so as to press the dough against the pins and thereby form radial furrows dividing the piece of dough into a plurality of sector-shaped panels only united to one another by a thin bottom layer of dough, means for introducing the rolling out member endwise into the open end of the cylinder, means for rotating the rolling out member and thereby rolling out each panel of dough over an adjacent panel, means for withdrawing the pins and the rolling out member from the cylinder, and means for expelling the folded dough from the cylinder.

4. A machine for folding "kaiser" rolls, comprising a vertical cylinder, a piston head longitudinally displaceable in the cylinder, a plurality of pins adapted to be inserted radially into the cylinder in a horizontal plane above the piston head, a rotatable radially arranged rolling out member located above the cylinder and movable in the direction of the axis of the cylinder, means for lowering the piston head to enable a piece of dough to be introduced into the top of the cylinder, means for pushing the pins radially into the cylinder, means for raising the piston head so as to press the dough against the pins and thereby form radial furrows dividing the piece of dough into a plurality of sector-shaped panels only united to one another by a thin bottom layer of dough, means for lowering the rolling out member into the cylinder, means for rotating the rolling out member and thereby rolling out each panel of dough over an adjacent panel, means for withdrawing the pins and the rolling out member from the cylinder, and means for further raising the piston head to expel the folded dough from the cylinder.

5. A machine for folding "kaiser" rolls, comprising a cylinder open at one end, a piston head longitudinally displaceable in the cylinder, a plurality of pins adapted to be inserted radially into the cylinder and withdrawn when required, a rotatable rolling out member co-axial with the cylinder and movable in the direction of the axis of the cylinder, radially arranged pivots on the rolling out member, rollers freely rotatable on the said pivots, means for retracting the piston head to enable a piece of dough to be introduced into the cylinder, means for pushing the pins radially into the cylinder, means for advancing the piston head so as to press the dough against the pins and thereby form radial furrows dividing the piece of dough into a plurality of sector-shaped panels only united to one another by a thin bottom layer of dough, means for introducing the rolling out member endwise into the open end of the cylinder, means for rotating the rolling out member and thereby rolling out each panel of dough over an adjacent panel, means for withdrawing the pins and the rolling out member from the cylinder, and means for expelling the folded dough from the cylinder.

6. For use in a machine for folding "kaiser" rolls, a rotatable and axially movable rolling out member, radially arranged pivots at the end of the rolling out member, and frusto-conical rollers freely rotatable on the said pivots, the small ends of the rollers being directed inwards.

7. A machine for folding "kaiser" rolls, comprising a vertical cylinder, a piston head longitudinally displaceable in the cylinder, a plurality of pins adapted to be inserted radially into the cylinder in a horizontal plane above the piston head, a rotatable radially arranged rolling out member located above the cylinder and movable in the direction of the axis of the cylinder, means for lowering the piston head to enable a piece of dough to be introduced into the top of the cylinder, means for pushing the pins radially into the cylinder, means for raising the piston head so as to press the dough against the pins and thereby form radial furrows dividing the piece of dough into a plurality of sector-shaped panels only united to one another by a thin bottom layer of dough, means for lowering the rolling out member into the cylinder, means for rotating the rolling out member and at the same time imparting to it a slight up and down movement, finishing with an ascending movement at the end of the rotation, and means for further raising the piston head to expel the folded dough from the cylinder.

8. A machine for folding "kaiser" rolls as claimed in claim 4, further comprising an annular pressing member arranged above the cylinder and adapted to press down the folds of the dough at the periphery, and means for bringing this pressing member into operation after the rolling out member has been raised out of the cylinder but before the folded dough has been expelled.

9. A machine for folding "kaiser" rolls, comprising a cylinder open at one end, a piston head longitudinally displaceable in the cylinder, a plurality of pins adapted to be inserted radially into the cylinder and withdrawn when required, a movable guiding head, a radially arranged rolling out member rotatably and slidably mounted in the movable guiding head in such a position that in one position of the guiding head the axis of the rolling out member is in alignment with the axis of the cylinder, an annular pressing member slidably mounted in the guiding head and adapted in one position of the guiding head to press down the folds of the "kaiser" roll at the periphery, means for shifting the guiding head so as to bring the rolling out member and the pressing member into alignment with the cylinder alternately, a common actuating member adapted to introduce the rolling out member and the pressing member into the cylinder alternatively, whichever is in alignment with the cylinder, means for retracting the piston head to enable a piece of dough to be introduced into the cylinder, means for pushing the pins radially into the cylinder, means for advancing the piston head so as to press the dough against the pins and thereby form radial furrows dividing the piece of dough into a plurality of sector-shaped panels only united to one another by a thin bottom layer of dough, means for rotating the rolling out member and thereby rolling out each panel of dough over an adjacent panel, means for withdrawing the pins and the rolling out member from the cylinder, and means for expelling the folded dough from the cylinder.

10. A machine for folding "kaiser" rolls as claimed in claim 9, further comprising means for regulating the length of stroke of the rolling out member and of the annular pressing member by shifting the common actuating member.

11. A machine for folding "kaiser" rolls as claimed in claim 3, further comprising a machine table, the open end of the cylinder being flush with the surface of the table, a swing arm adapted to oscillate past the open end of the cylinder in a plane perpendicular to the axis of the cylinder, and means for oscillating the swing arm after the folded dough has been expelled from the cylinder, and thereby removing the dough to a position near the edge of the machine table.

12. A machine for folding "kaiser" rolls as claimed in claim 3, further comprising a feeder oscillatable past the open end of the cylinder in a plane perpendicular to the axis of the cylinder, and means for oscillating the feeder into a position immediately above the cylinder to supply a piece of dough to the cylinder.

13. A machine for folding "kaiser" rolls as claimed in claim 3, further comprising a machine table, the open end of the cylinder being flush with the surface of the machine table, and a feeder consisting of an arm oscillating on the surface of the machine table and a ring at the end of the arm, the interior of the ring forming a cavity for the reception of a piece of dough to be fed to the cylinder, and the bottom of this cavity being formed by the machine table until the ring reaches a position in alignment with the cylinder.

14. A machine for folding "kaiser" rolls as claimed in claim 4, further comprising an annular pressing member arranged above the cylinder and adapted to press down the folds of the dough at the periphery, and means for bringing this pressing member into operation after the rolling out member has been raised out of the cylinder but before the folded dough has been expelled, the annular pressing member comprising a cylindrical casing, a piston slidable in the cylindrical casing, means for displacing the cylindrical casing longitudinally into contact with the margin of the folded dough, and means for keeping the piston stationary while the cylindrical casing is moved towards the dough.

15. A machine for folding "kaiser" rolls, comprising a vertical cylinder, a piston head longitudinally displaceable in the cylinder, a plurality of pins adapted to be inserted radially into the cylinder in a horizontal plane above the piston head, a guiding head oscillatable about a vertical axis, a radially arranged rolling out member rotatable about a vertical axis and vertically slidable in the guiding head, an annular pressing member vertically slidable in the guiding head, means for oscillating the guiding head so as to bring the rolling out member and the pressing member alternately into a position immediately above the cylinder, a common actuating lever adapted to depress into the cylinder whichever of these two members is immediately above the cylinder, means for pushing the pins radially into the cylinder, means for raising the piston head so as to press the dough against the pins and thereby form radial furrows dividing the piece of dough into a plurality of sector-shaped panels only united to one another by a thin bottom layer of dough, means for lowering the rolling out member into the cylinder, means for rotating the rolling out member and thereby rolling out each panel of dough over an adjacent panel, means for withdrawing the pins and the rolling out member from the cylinder, and means for expelling the folded dough from the cylinder, the means for rotating the rolling out member comprising a lever pivotally mounted on the guiding head, a cam disc, and a rod adapted to be displaced by the cam disc and to rock the said lever.

16. A machine for folding "kaiser" rolls as claimed in claim 9, further comprising a pull rod for communicating motion to the common actuating member, a cam for controlling the motion of the pull rod, and an adjustable lost motion device enabling the length of the pull rod to be altered at will so as to regulate the length of stroke of the rolling out member and of the annular pressing member.

In testimony whereof we have signed our names to this specification.

MAX SPITZ.
JOSEF SROVNAL.